United States Patent
Wang

(10) Patent No.: US 10,080,051 B1
(45) Date of Patent: Sep. 18, 2018

(54) METHOD AND SYSTEM FOR IMMERSIVE INFORMATION PRESENTATION

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 15/793,158

(22) Filed: Oct. 25, 2017

(51) Int. Cl.
| | | |
|---|---|---|
| *H04N 21/431* | (2011.01) | |
| *H04N 21/443* | (2011.01) | |
| *H04N 21/41* | (2011.01) | |

(52) U.S. Cl.
CPC ..... *H04N 21/4316* (2013.01); *H04N 21/4122* (2013.01); *H04N 21/4438* (2013.01)

(58) Field of Classification Search
CPC ........... H04N 21/4316; H04N 21/4854; H04N 21/4318; H04N 5/45; H04N 5/445; H04N 5/44591; H04N 5/58; G09G 2320/00626; G09G 2320/06
See application file for complete search history.

(56) References Cited

U.S. PATENT DOCUMENTS

| | | | | |
|---|---|---|---|---|
| 5,291,295 A * | 3/1994 | Srivastava | ........... | H04N 7/0122 348/555 |
| 5,438,372 A * | 8/1995 | Tsumori | ................... | H04N 5/45 348/563 |
| 5,825,347 A * | 10/1998 | Prinsen | ................... | G06F 19/12 345/629 |
| 6,008,860 A * | 12/1999 | Patton | ...................... | H04N 5/45 348/564 |
| 6,556,253 B1 * | 4/2003 | Megied | .................. | G09G 1/002 348/565 |
| 6,611,297 B1 * | 8/2003 | Akashi | ............... | H04N 21/4131 348/602 |
| 6,697,123 B2 * | 2/2004 | Janevski | ................... | H04N 5/45 348/565 |
| 6,778,226 B1 * | 8/2004 | Eshelman | ................ | H04N 5/64 348/553 |
| 6,784,945 B2 * | 8/2004 | Norsworthy | ............. | H04N 5/45 348/564 |
| 7,061,544 B1 * | 6/2006 | Nonomura | ......... | H04N 5/44543 348/465 |
| 7,119,849 B2 * | 10/2006 | Yui | .......................... | G06F 3/14 348/564 |

(Continued)

*Primary Examiner* — Brian Yenke
(74) *Attorney, Agent, or Firm* — Anova Law Group, PLLC

(57) ABSTRACT

An information presentation method includes steps of providing a plurality of displays comprising a main screen and at least one picture-in-picture (PiP) window, the main screen having a first displaying region for displaying a first content in the first displaying region, and the at least one PiP window displaying a second content in at least a portion of the first displaying region; providing a surrounding display circumambiently located around the plurality of displays for displaying a third content; determining an immersive impact region and a non-immersive impact region in the plurality of displays; calculating an immersive effect (IE) of the plurality of displays; and displaying the first content or the second content on the immersive impact region and the non-immersive impact region with different intensities based on the IE.

16 Claims, 5 Drawing Sheets

(56) References Cited

U.S. PATENT DOCUMENTS

| | | | | |
|---|---|---|---|---|
| 7,148,909 B2* | 12/2006 | Yui | | G06F 3/14 345/660 |
| 7,206,029 B2* | 4/2007 | Cohen-Solal | | H04N 5/45 345/629 |
| 7,209,180 B2* | 4/2007 | Takagi | | H04N 7/0122 348/445 |
| 7,486,337 B2* | 2/2009 | Bian | | H04N 5/44504 345/589 |
| 7,894,000 B2* | 2/2011 | Gutta | | H04N 9/12 348/553 |
| 7,898,600 B2* | 3/2011 | Lee | | G09G 5/14 348/565 |
| 8,130,330 B2* | 3/2012 | Tan | | H04N 5/144 345/629 |
| 8,212,930 B2* | 7/2012 | Park | | H04N 5/58 348/602 |
| 8,599,313 B2* | 12/2013 | Barenbrug | | H04N 5/44591 348/563 |
| 8,797,372 B2* | 8/2014 | Liu | | H04M 1/72569 345/63 |
| 8,847,972 B2* | 9/2014 | Kane | | G01J 1/42 345/589 |
| 9,071,800 B2* | 6/2015 | Ikawa | | H04N 5/58 |
| 9,270,921 B2* | 2/2016 | Kim | | G09G 5/00 |
| 9,432,612 B2* | 8/2016 | Bruhn | | H04N 7/106 |
| 9,436,076 B2* | 9/2016 | Kim | | E04H 3/22 |
| 9,494,847 B2* | 11/2016 | Katahira | | G09G 5/02 |
| 9,495,004 B2* | 11/2016 | Cho | | G06F 3/005 |
| 9,520,075 B2* | 12/2016 | Cho | | G09G 3/2003 |
| 9,799,306 B2* | 10/2017 | Dunn | | G09G 5/02 |
| 9,927,867 B2* | 3/2018 | Yeom | | G06F 3/011 |
| 2002/0075407 A1* | 6/2002 | Cohen-Solal | | H04N 5/45 348/565 |
| 2002/0140862 A1* | 10/2002 | Dimitrova | | H04N 5/45 348/565 |
| 2003/0081834 A1* | 5/2003 | Philomin | | G06F 3/011 382/190 |
| 2004/0201780 A1* | 10/2004 | Kim | | H04N 5/45 348/565 |
| 2007/0242162 A1* | 10/2007 | Gutta | | H04N 9/12 348/645 |
| 2008/0016532 A1* | 1/2008 | Wang | | H04N 5/4401 725/45 |
| 2009/0167950 A1* | 7/2009 | Chen | | G06F 3/14 348/602 |
| 2009/0180024 A1* | 7/2009 | Lai | | H04N 5/272 348/565 |
| 2009/0289874 A1* | 11/2009 | Ha | | H04N 5/64 345/1.3 |
| 2010/0079480 A1* | 4/2010 | Murtagh | | G06T 15/503 345/592 |
| 2013/0222386 A1* | 8/2013 | Tannhauser | | G06T 11/60 345/428 |
| 2013/0265232 A1* | 10/2013 | Yun | | G09G 3/3208 345/158 |
| 2014/0285477 A1* | 9/2014 | Cho | | G09G 3/2003 345/207 |

\* cited by examiner

METHOD AND SYSTEM FOR IMMERSIVE INFORMATION PRESENTATION

FIELD OF THE DISCLOSURE

The present disclosure relates to the field of information presentation technologies and, more particularly, relates to immersive information presentation.

BACKGROUND

For years, researchers have been struggling to bring immersive experiences to home entertainment. Immersive experiences with additional light sources (e.g., project lights, back-light displays, and so on) surround a big screen (e.g. TV display, monitor, and so on) have been extensively explored in the past years. Based on the observation that a larger display with a wider field of view may deliver to the user more immersed and present experience. The focus points of the recent research have been on how to extend the screen content in focus with surrounding effects or rich information to create immersive experiences. As shown in FIG. 1, the surrounding effect is not limited to the front wall. Surrounding effect can even be extended to the sidewalls and the desks in front of the user.

Many types of illusions, such as edge effects, lighting changes, starfield effects, and so on, are created to increase the user's sense of presence. It is important to realize that the efforts mentioned above are based on the Focus+Context display concept. The surrounded contexts are used to enhance the focus display, and a single content source is considered for the focus display, which is either gaming or video streaming content displayed on a TV screen.

Nowadays, mobile devices, such as smartphones and tablets, are becoming more powerful in terms of computing and display, projectors are becoming smaller, quieter, and with higher resolution. TVs are becoming a big screen computer with easy access to the Internet and many video content providers (e.g., YouTube and Netflix), and link capacity around individual device has been significantly increased. As a result, the home entertainment systems are experiencing revolutionary changes. Many devices surround people in their daily lives, and provide various ways to access, retrieve, and view contents. People use different devices at different scenarios. For example, a user may enjoy a show on a big-screen TV at home, or on a tablet when going to a room without TV, and continue the experience on a smartphone when stepping out of the house. Such continuous and seamless viewing experience requires collaboration among devices and intelligence in determining user intension.

The usage model of the main screen is experiencing transition from only single content source to support multiple content sources. In 2014, Samsung released its Multi-Link Screen product that can let user display up to four screens on a UHD TV or two screens on a Full HD TV simultaneously on one screen to support the ultimate multi-viewing experience, so that the user can watch TV and YouTube videos, browse the web and watch TV, watch two different TV shows at the same time, or watch TV and play with apps.

Overall, immersive entertainment is expected to be a collaborative effort among devices, users and content. The disclosed method and system are directed to solve one or more problems in this area. It should be noted that, unless explicitly acknowledged, the above background information is part of the present disclosure and is not intended to be prior art.

BRIEF SUMMARY OF THE DISCLOSURE

One aspect of the present disclosure provides an information presentation method. The method includes: providing a plurality of displays comprising a main screen and at least one picture-in-picture (PiP) window, the main screen having a first displaying region for displaying a first content in the first displaying region, and the at least one PiP window displaying a second content in at least a portion of the first displaying region; determining an immersive impact region and a non-immersive impact region for each of the plurality of displays; providing a surrounding display around the plurality of displays for displaying a third content, the surrounding display being displayed on one or more overlapping immersive impact regions; calculating an immersive effect (IE) value for each of the plurality of displays; and displaying the third content on the surrounding display based on the IE values.

Another aspect of the present disclosure provides an information presentation system. The system includes: a plurality of displays comprising a main screen and at least one picture-in-picture (PiP) window, the main screen having a first displaying region for displaying a first content in the first displaying region, and the at least one PiP window displaying a second content in at least a portion of the first displaying region; and a surrounding display around the plurality of displays for displaying a third content; wherein the first content or the second content is displayed in a non-immersive impact region and the third content is displayed in an immersive impact region based on an immersive effect (IE) of the plurality of displays.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, a display refers to a display with a source providing on-screen content. A display may refer to a main screen display or a Picture-in-Pictire (PiP) window in a main display. A surrounding display (SD) refers to a display area with content derived from one or more displays. A display or a SD may be an LCD screen, a projected display, or any other forms of displays. In embodiments of the present disclosure, the image in the SD may be generated to enhance the visual effect of one or more displays. The immersive effect (IE) for a display refers to the light intensity distribution of the light emitting source for the displays or the SD.

Figure 1:
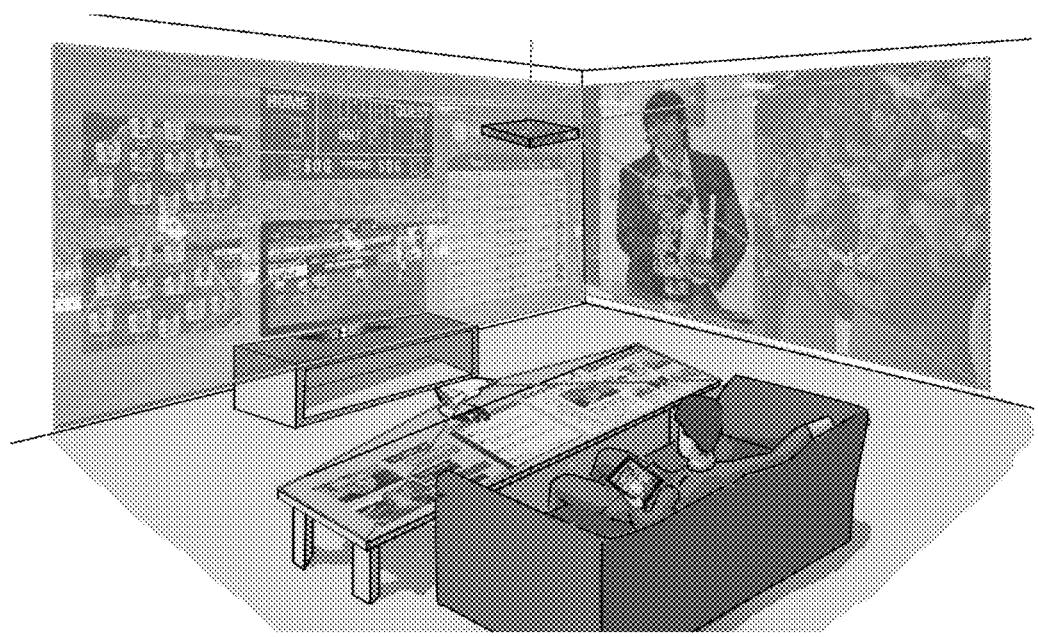
FIG. 1 illustrates an immersive environment of the conventional technology.
Figure 2:
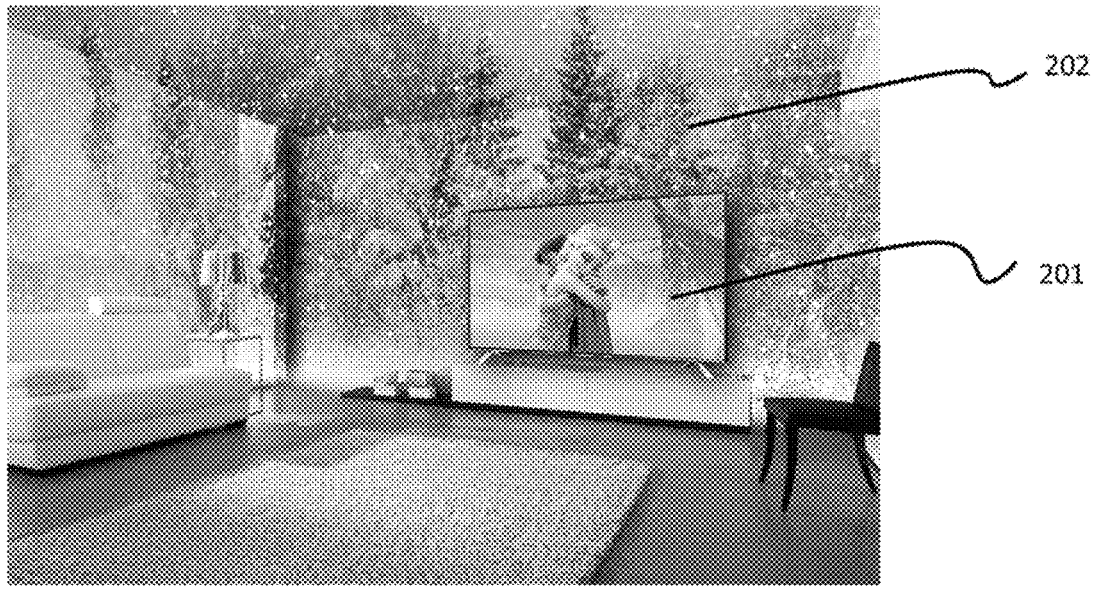
FIG. 2 illustrates an immersive effect of an exemplary information presentation system consistent with various disclosed embodiments.

The present disclosure provides the usage model of co-existent, multiple levels of, displays with immersive experiences. FIG. 2 illustrates an immersive effect of an exemplary information presentation system consistent with various disclosed embodiments. As shown in FIG. 2, the immersive effect may be created by blurring the boundaries between the on-screen content 201 and the surrounding room lights 202, which may be content created ahead of time, or content automatically generated in real time.

Figure 3:
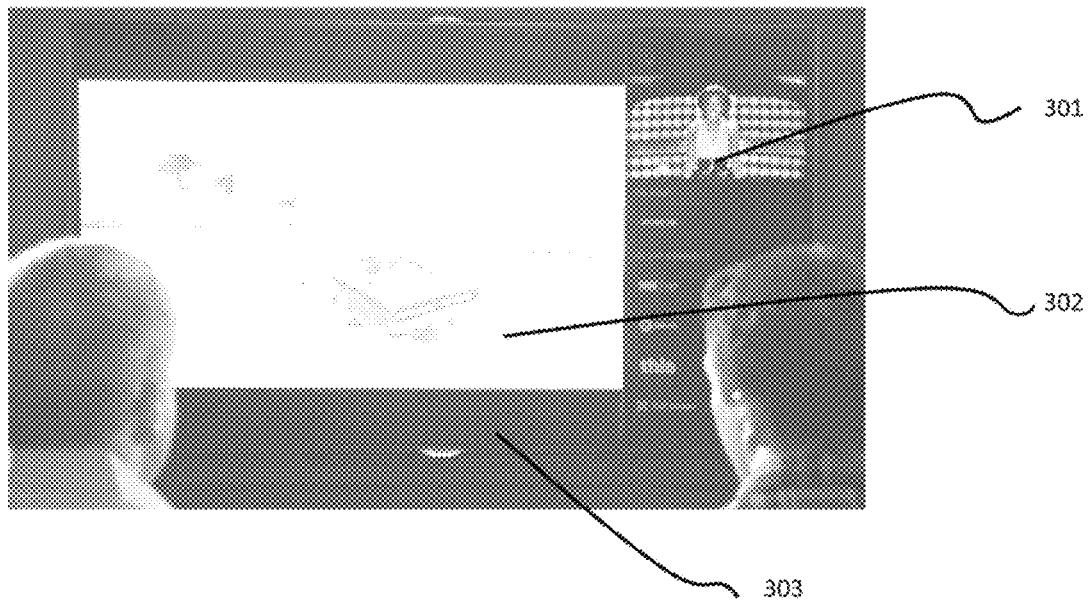
FIG. 3 illustrates a scenario of an exemplary information presentation system consistent with various disclosed embodiments.

To consider more generic multiple content source scenarios, the main TV screen may contain multiple smaller windows in arbitrary locations with arbitrary window sizes, and each window may render content from different sources. FIG. 3 illustrates a scenario of an exemplary information presentation system consistent with various disclosed embodiments. In FIG. 3, users may watch TV program when playing a video game. The TV program may be displayed on the first portion 301 of the main display 303, and the video game may be displayed on the second portion 302 of the main display 303. The first portion 301 and the second portion 302 may be two picture-in-picture (PiP) windows displayed on the main display 303.

Figure 4:
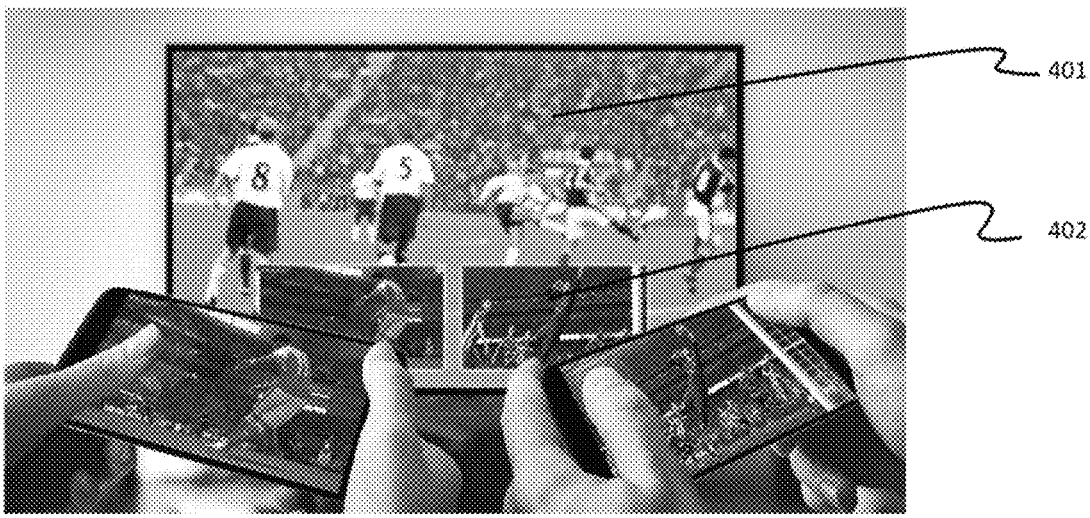
FIG. 4 illustrates another scenario of an exemplary information presentation system consistent with various disclosed embodiments.

FIG. 4 illustrates another scenario of an exemplary information presentation system consistent with various disclosed embodiments. In FIG. 4, users may project their mobile phone screens on TV display when watching a TV program. The main screen 401 may display a TV program and the picture-in-picture (PiP) windows 402 may display the content of the user's mobile phones.

Figure 5:
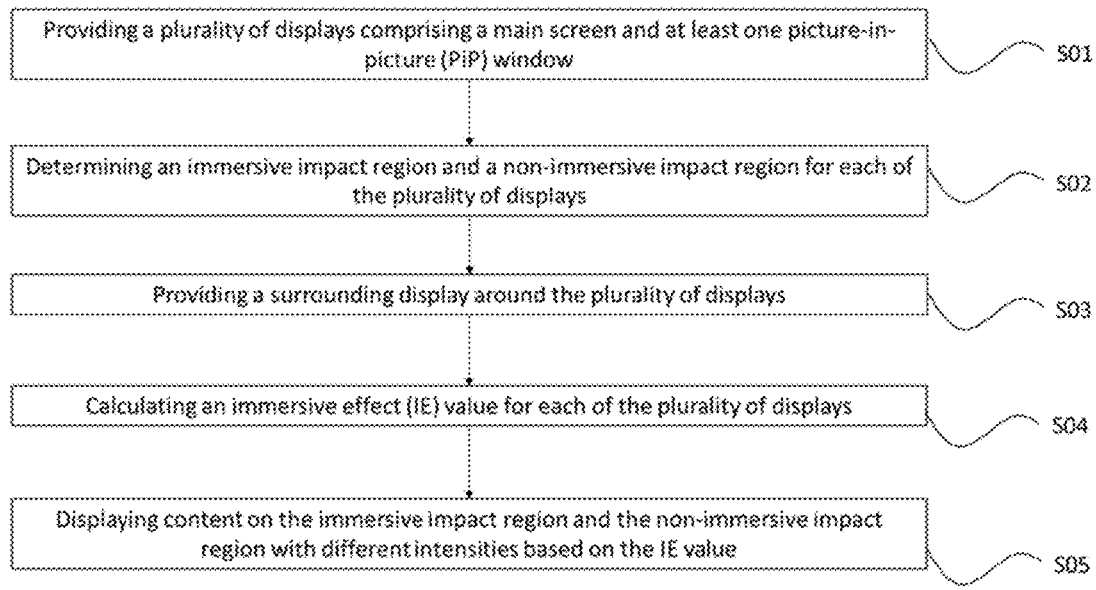
FIG. 5 illustrates a flow chart of an exemplary information presentation method consistent with various disclosed embodiments.

The present disclosure provides the usage model of co-existence of multiple levels of displays with immersive experiences. Referring to FIG. 5, FIG. 5 illustrates a flow chart of an exemplary information presentation method consistent with various disclosed embodiments. In step S01, the information presentation method provides a plurality of displays comprising a main screen and at least one picture-in-picture (PiP) window. The main screen having a first displaying region for displaying a first content in the first displaying region, and the at least one PiP window displaying a second content in at least a portion of the first displaying region.

In step S02, the information presentation method may further determine an immersive impact region and a non-immersive impact region for each of the plurality of displays. In step S03, the information presentation method may further provide a surrounding display circumambiently located around the plurality of displays for displaying a third content, the surrounding display being displayed on one or more overlapping immersive impact regions.

Figure 6:
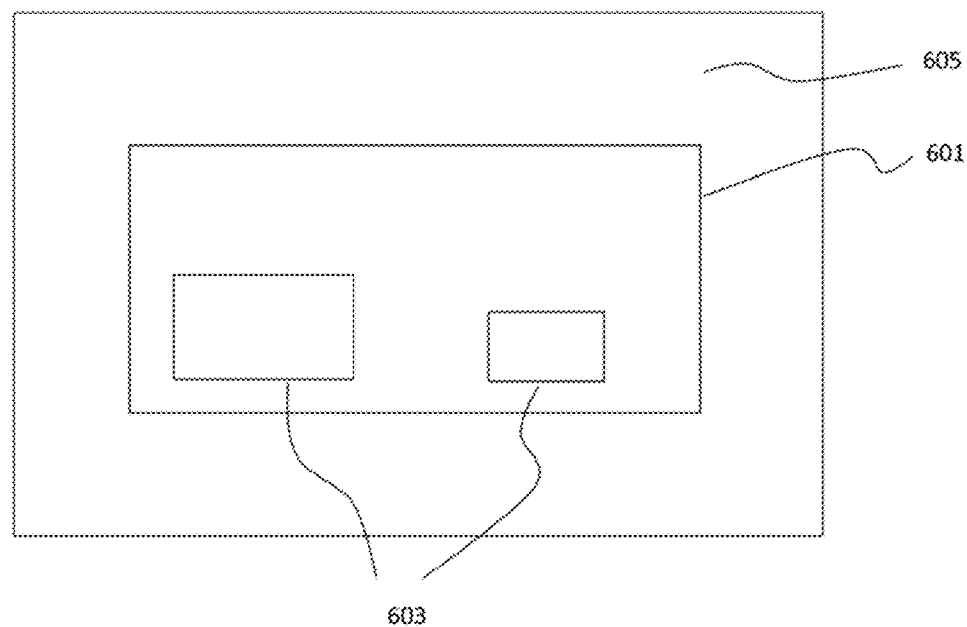
FIG. 6 illustrates the topological relationship of displays of an exemplary information presentation system consistent with various disclosed embodiments.

For example, as shown in FIG. 6, the plurality of displays may include the Main Screen (MS) 601, which is the main display (e.g. TV display or projected space) or focus display broadcasting a TV program; PiP (or Picture-in-Picture) Windows 603, which is the smaller windows inside the main screen, displaying another video program, and the PiP windows 603 may display separately rendered content or mirror the image of the MS, or other screens. The Surrounding Display (SD) 605, which is the context display that may display immersive illusions and this display may be a bigger screen or a larger projection area. In some embodiments, SD may be defined as the context display areas outside the main display.

The PiP Windows 603 may be expanded to fully cover the space of Main Screen 601 when needed. For example, on some TV displays, the user may have a choice to split the rectangular Main Screen 601 space to 4 same sized rectangular PiP Windows 603. The impact of the immersive effect from the PiP Windows 603 on the Surrounding Display 605 may be evaluated. Generally, the content on the Main Screen 601 may not be compromised by the PiP Windows 603 extended effect unless the Main Screen 601 is fully covered by the PiP Windows 603. In FIG. 6, the region of Surrounding Display 605 (outside of Main Screen 601) may be a display area with blended immersive effect generated jointly by Main Screen 601 and multiple PiP Windows 603, thus to identify the intensity of the pixels inside of this Surrounding Display 605 region is the key goal.

Figure 7:
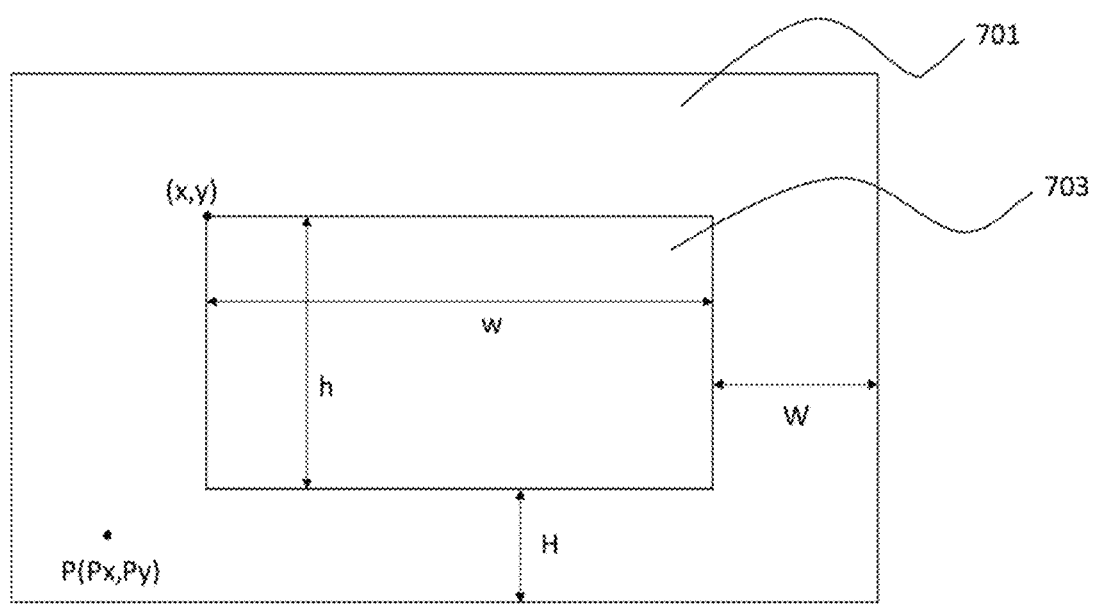
FIG. 7 illustrates the calculation of factors of an exemplary information presentation system consistent with various disclosed embodiments.

As shown in FIG. 7, each display MS 601 or PiP Window 603 may be defined by an immersive impact region 701 and a non-immersive impact region 703. As the light has degradation according to distance, the closer a pixel to the light source, the stronger its intensity, and the farther from the light source the less intensity. In this example, the Surrounding Display SD may be defined as the overlapping portion of the immersive impact regions 701 of all displays. Furthermore, in another example having one MS 601 and one Surrounding Display 605, the immersive impact region 701 may be the same region as the Surrounding Display 605, and the non-immersive impact region 703 may be the same region as the MS 601.

In the embodiments of the present disclosure, the immersive contribution from each display (MS 601 or PiP Window 603) to the SD 605 may follow the same principle. The immersive effect (IE), or the intensity contribution, may be degraded according to the distance from the light source. The immersive effect (IE) may be the light intensity distribution of the light source emitting for the displays MS 601, PiP Window 603 or SD 605.

The embodiments of the present disclosure may denote ($B_i$, $T_i$) as the lower and upper bound thresholds of the immersive effect for the i-th display corresponding to the light degradation, and both thresholds are in the range of [0.0, 1.0]. The threshold pair value may be set by users for each display so that they are able to control the overall immersive effect contributed from each content sources. For example, if the pair is set to (0.0, 0.0), it means this display has turned off the immersive effect. If Bi=Ti, then the degradation effect is turned off.

As shown in FIG. 7, the embodiments of the present disclosure may denote (x,y) as the starting point of a display, and (w, h) as the width and height of the display. The immersive impact region 701 may have a width of W and height of H, as shown in FIG. 7. Then the immersive impact factor (IIF) may be calculated for any point inside the immersive impact region 701, (e.g., point P(Px, Py)) for the i-th display as follows:

$$IIF_{i,Px,Py} = \begin{cases} Bi + \frac{\max(y-Py, Py-y-h)}{H}(Ti-Bi) & \text{if } x \le Px \le x+w \\ Bi + \frac{\max(x-Px, Px-x-w)}{W}(Ti-Bi) & \text{if } y \le Py \le y+h \\ Bi + \frac{\max(y-Py, Py-y-h)+}{H+W}(Ti-Bi) & \text{otherwise} \end{cases} \quad (1)$$

Bi is a lower bound threshold of the immersive impact for the i-th display of the plurality of displays, Ti is an upper bound threshold of the immersive impact for the i-th display of the plurality of displays, both Bi and Ti are in the range of [0.0, 1.0], (x,y) is a starting point of the plurality of displays, (Px, Py) is a point inside the immersive impact region, (w, h) is the width and height of the plurality of displays, and the immersive impact region of the plurality of displays has a width of W and height of H.

Returning to FIG. 5, in step S04, the information presentation method further calculates the immersive effect (IE) of the plurality of displays. Before rendering the display, each display generates its immersive impact region by either automatically generating the immersive effect or pre-designing the immersive effect with user interaction or input.

In most scenarios, the user may choose not to impose immersive impact from PiP Windows 603 over the Main Screen 601, thus the surrounding display (SD) 605 areas are impacted by all other displays. Therefore, the rendering of the SD 605 is conducted by re-calculating each pixel, for example, (Px, Py) in FIG. 7, in the immersive impact region 701 with the following steps shown in FIG. 8.

Step 801: Check with the next display in the list of (n-1) displays, to determine whether it is inside the immersive impact region of this display (see example in FIG. 7), if yes, go to step 802; if this is the last display, go to step 805; otherwise loop back to step 801. n is the quantity of the plurality of displays.

Step 802: Calculate the immersive impact factor (IIF) value using Eq. (1) and store the value.

Step 803: Obtain the intensity value of the generated immersive effect (IE), and store the value.

Step 804: If this is the last display, go to step 805, otherwise, go to step 801.

Step 805: Obtain the background value of SD for this pixel (if available), and assign it to IEn, and obtain the default IIF setting for SD set by user (if not available, set to 0.0) and assign it to IIFn.

Step 806: Blend all the stored IIFj and IEj (j=1, ... n) with following equation to achieve the intensity for this pixel:

$$\text{Intensity} = \frac{\sum_{j=1}^{n} IIFj * IEj}{\sum_{j=1}^{n} IIFj} \quad (2)$$

Step 807: End of the process.

In step 505, the information presentation method further displays the first content or the second content on the SD with different intensities based on the calculation of Equation (2) and the non-immersive impact region. The first content may be the image to create the immersive effect for a display. The second content may be the on-screen content from the content source of the display. The boundary between the main screen and the surrounding display may be a blurred boundary, and the boundary between the at least one PiP Window and the surrounding display may be a blurred boundary as well.

Furthermore, the third content displayed on the surrounding display 605 may provide a surrounding context related to the first content (e.g., a TV program) for enhancing the first content displayed on the main screen 601. For example, a high-resolution display MS may be surrounded by a lower resolution projection screen SD to enhance immersive visual experiences. The users may perceive the scene-consistency, low-resolution color, light, and movement patterns projected into their peripheral vision as a seamless extension of the primary content. The surrounding context may be automatically generated in real time based on the first content.

In another embodiment of the present disclosure, the third content displayed on the surrounding display SD may comprise a social network content, a news or article related to the first content, an instant messaging window, or a different angle view of the first content.

Another embodiment of the present disclosure provides an information presentation system. As shown in FIG. 6, the information presentation system may include a plurality of displays comprising a main screen 601 and at least one picture-in-picture (PiP) window 603, and a surrounding display SD 605 circumambiently located around the plurality of displays. The main screen 601 may include a first displaying region for displaying a first content in the first displaying region, and the at least one PiP window 603 may display a second content in at least a portion of the first displaying region. The surrounding display 605 is circumambiently located around the plurality of displays 601 and 603 for displaying a third content. Each of the plurality of displays 601 and 603 comprises an immersive impact region 701 and a non-immersive impact region 703. The first content or the second content on the immersive impact region and the non-immersive impact region is displayed with different intensities based on an immersive effect (IE) of the plurality of displays.

In the embodiments of the present disclosure, the immersive contribution from each display (MS 601 or PiP Window 603) to the SD 605 may follow the same principle. The immersive effect (IE), or the intensity contribution, may be degraded according to the distance from the light source. The embodiments of the present disclosure may denote (Bi, Ti) as the lower and upper bound thresholds of the immersive effect for the i-th display corresponding to the light degradation, and both thresholds are in the range of [0.0, 1.0]. The threshold pair value may be set by users for each display so that they are able to control the overall immersive effect contributed from each content sources. For example, if the pair is set to (0.0, 0.0), it means this display has turned off the immersive effect. If Bi=Ti, then the degradation effect is turned off.

The embodiments of the present disclosure may denote (x,y) as the starting point of a display, and (w, h) as the width and height of the display. The immersive impact region 701 has a width of W and height of H, as shown in FIG. 7. Then the immersive impact factor (IIF) may be able to be calculated for any point inside the immersive impact region 701, (e.g., point P(Px, Py)) for the i-th display as follows:

$$= \begin{cases} Bi + \frac{\max(y - Py, Py - y - h)}{H}(Ti - Bi) & \text{if } x \leq Px \leq x + w \\ Bi + \frac{\max(x - Px, Px - x - w)}{W}(Ti - Bi) & \text{if } y \leq Py \leq y + h \\ Bi + \frac{\max(y - Py, Py - y - h) + \max(x - Px, Px - w - w)}{H + W}(Ti - Bi) & \text{otherwise} \end{cases} \quad (1)$$

Bi is a lower bound threshold of the immersive impact for the i-th display of the plurality of displays; Ti is an upper bound threshold of the immersive impact for the i-th display of the plurality of displays; both Bi and Ti are in the range of [0.0, 1.0]; (x,y) is a starting point of the plurality of displays; (Px, Py) is a point inside the immersive impact region; (w, h) is the width and height of the plurality of displays; and the immersive impact region of the plurality of displays has a width of W and height of H.

The information presentation system may further calculate the immersive effect (IE) of the plurality of displays. Before rendering, each display generates its immersive impact region by either automatically generating the effect or pre-designing the immersive effect with human interaction or input. In most scenarios, the user may choose not to impose the immersive impact from PiP Windows 603 to Main Screen 601, thus the surrounding display (SD) 605 areas are impacted by all other displays. When the main screen 601 or the at least one PiP window 603 is located inside the non-immersive impact region, the information presentation system may further determine an immersive impact factor (IIF) for the main screen or for the at least one PiP window based on an intensity value IE, a background value for the surrounding display, and the background value being assigned to the IE, and a default IIF setting defined by a user, and the default IIF setting being assigned to the IIF. The IIF and the IE of the plurality of displays may be combined to re-calculate intensities of each pixel, for example, at location (Px, Py) in FIG. 7, in surrounding display SD.

Figure 8:
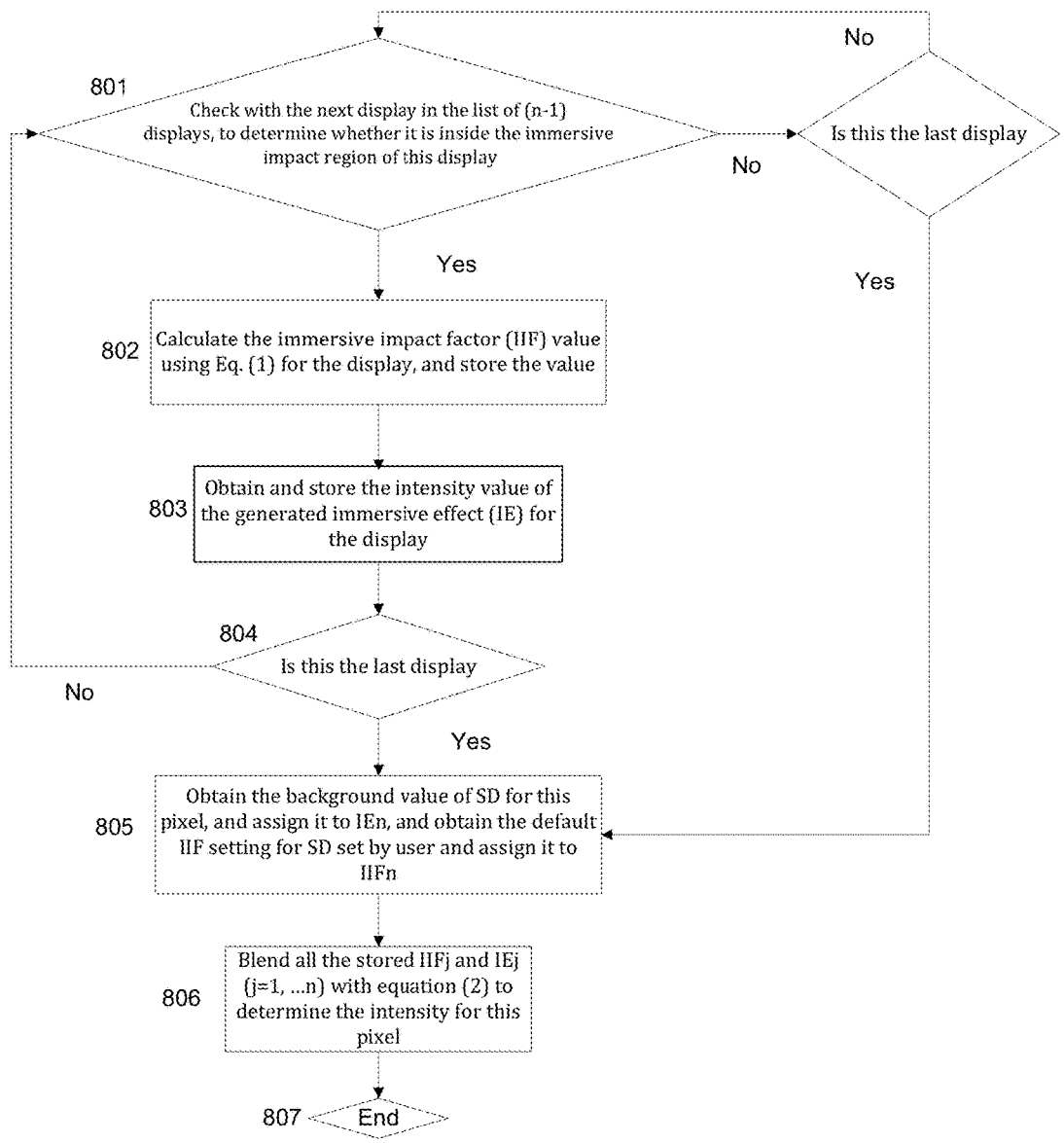
FIG. 8 illustrates a flow chart of re-calculating an exemplary information presentation method consistent with various disclosed embodiments.

Therefore, the rendering of the SD 605 may be conducted by re-calculating each pixel in the immersive impact region 701 with the following steps shown in FIG. 8.

Step 801: Check with the next display in the list of (n-1) displays, to determine whether it is inside the immersive impact region of this display (see example in FIG. 7). If yes, go to step 802. Otherwise, if this is the last display, go to step 805. Otherwise loop back to restart step 801. n is the quantity of the plurality of displays.

Step 802: Calculate the immersive impact factor (IIF) value using Eq. (1) for the display, and store the value.

Step 803: Obtain and store the intensity value of the generated immersive effect (IE) for the display.

Step 804: If this is the last display, go to step 805 below, otherwise, go to step 801.

Step 805: Obtain the background value of SD in this pixel (if available), and assign it to IEn, and fetch the default IIF setting for SD by user (if not available set to 0.0) and assign it to IIFn.

Step 806: Blend all the stored IIFj and IEj (j=1, . . . n) using the following equation to determine the intensity for this pixel:

$$\text{Intensity} = \frac{\sum_{j=1}^{n} IIFj * IEj}{\sum_{j=1}^{n} IIFj} \quad (2)$$

Step 807: End of the process.

The information presentation system may further display the first content or the second content on the SD with different intensities based on the calculation of Equation (2) and the non-immersive impact region. The first content may be the image to create the immersive effect for a display. The second content may the on-screen content from the content source of the display. The boundary between the main screen and the surrounding display may be a blurred boundary, and the boundary between the at least one PiP window and the surrounding display may be a blurred boundary as well.

Furthermore, the third content displayed on the surrounding display 605 may be a surrounding context related to the first content (e.g., a TV program) for enhancing the first content displayed on the main screen 601. For example, a high-resolution display MS may be surrounded by a lower resolution projection screen SD to enhance immersive visual experiences. The users perceive the scene-consistency, low-resolution color, light, and movement patterns projected into their peripheral vision as a seamless extension of the primary content. The surrounding context may be automatically generated in real time based on to the first content.

In another embodiment of the present disclosure, the third content displayed on the surrounding display SD may comprise a social network content, a news or article related to the first content, an instant messaging window, or a different angle view of the first content.

The present disclosure proposes a novel framework to enable the immersive experience for such complicated multiple displays and multiple content sources condition.

It is understood that the disclosed collaborative and scalable information presentation system is not limited to sports watching scenario. The disclosed systems and methods can also be applied to other information presentation scenarios, such as watching news, movies and playing video games, displaying exhibits, presenting technologies and business plans, etc. Further, the disclosed system and method can be applied to any devices with displays, such as smart phones, tablets, PCs, smart watches, and so on.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An information presentation method, comprising:
providing a plurality of displays comprising a main screen and at least one picture-in-picture (PiP) window, the main screen having a first displaying region for displaying a first content in the first displaying region, and the at least one PiP window displaying a second content in at least a portion of the first displaying region;

determining an immersive impact region and a non-immersive impact region for each of the plurality of displays;

providing a surrounding display around the plurality of displays for displaying a third content, the surrounding display being displayed on one or more overlapping immersive impact regions;

calculating an immersive effect (IE) value for each of the plurality of displays, comprising:
  obtaining the IE value for each of the plurality of displays;
  determining an immersive impact factor (IIF) value a pixel based on a position of the pixel and the IE values;
  obtaining a background value of the surrounding display in a pixel, and assigning the background value as an additional IE value;
  obtaining a default IIF value of the pixel, and assigning the default IIF value to an additional IIF value; and
  determine an intensity of the pixel based on the IIF values and the IE values by combining all IIFi and IEi (i=1, . . . n) as follows:

$$Intensity = \frac{\sum_{j=1}^{n} IIFj * IEj}{\sum_{j=1}^{n} IIFj},$$

wherein n is the quantity of the plurality of displays; and
displaying the third content on the surrounding display based on the IE values.

2. The information presentation method according to claim 1, further comprising:
displaying a first blurring boundary between the main screen and the surrounding display; and
displaying a second blurring boundary between the at least one PiP window and the surrounding display.

3. The information presentation method according to claim 1, wherein the third content displayed on the surrounding display is related to the first content displayed on the main screen.

4. The information presentation method according to claim 3, wherein the surrounding context is generated in real time based on to the first content.

5. The information presentation method according to claim 1, wherein the IE is a light intensity distribution of a light emitting source for each display of the plurality of displays.

6. The information presentation method according to claim 1, wherein the at least one PiP window fully covers the main screen.

7. The information presentation method according to claim 1, wherein the main screen is divided into a plurality of predefined sizes, and the at least one PiP window is displayed on at least one of the plurality of predefined sizes.

8. The information presentation method according to claim 1, wherein the IE of each of the plurality of displays is based on the width and height of the immersive impact region and a non-immersive impact region of the display.

9. The information presentation method according to claim 1, wherein determining the IIF comprising calculating the IIF for a position (Px, Py) inside the immersive impact region as follows:

$$= \begin{cases} Bi + \frac{\max(y - Py, Py - y - h)}{H}(Ti - Bi) & \text{if } x \leq Px \leq x + w \\ Bi + \frac{\max(x - Px, Px - x - w)}{W}(Ti - Bi) & \text{if } y \leq Py \leq y + h \\ Bi + \frac{\max(y - Py, Py - y - h) +}{H + W}(Ti - Bi) & \text{otherwise} \end{cases},$$

wherein Bi is a lower bound threshold of the IE for the i-th display of the plurality of displays, Ti is an upper bound threshold of the IE for the i-th display of the plurality of displays, both Bi and Ti are in the range of [0.0, 1.0], (x,y) is a starting point of the plurality of displays, (w, h) is a width and a height of the plurality of displays, and W and H are a width and a height of the immersive impact region of the plurality of displays.

10. An information presentation system, comprising:
a plurality of displays comprising a main screen and at least one picture-in-picture (PiP) window, the main screen having a first displaying region for displaying a first content in the first displaying region, and the at least one PiP window displaying a second content in at least a portion of the first displaying region;
a surrounding display around the plurality of displays for displaying a third content; wherein the first content or the second content is displayed in a non-immersive impact region and the third content is displayed in an immersive impact region based on an immersive effect (IE) of the plurality of displays; and
when the main screen or the at least one PiP window is located inside the non-immersive impact region, the system further determines:
  an IIF value for a point (Px, Py) inside an immersive impact region of the main screen;
  an IIF value for the point (Px, Py) inside an immersive impact region of for the at least one PiP window;
  an IE value for the main screen;
  an IE value for the at least one PiP window;
  a background IE value of the surrounding display of a pixel; and
  a default IIF value of the pixel, wherein an intensity of the pixel are re-calculated based on the IIF values and the IE values of the main display and the at least one PiP window by combining all IIFi and IEi (i=1, . . . n) as follows:

$$Intensity = \frac{\sum_{j=1}^{n} IIFj * IEj}{\sum_{j=1}^{n} IIFj},$$

wherein n is the quantity of the plurality of displays.

11. The information presentation system according to claim 10, wherein a first blurring boundary is between the main screen and the surrounding display; and a second blurring boundary is between the at least one PiP window and the surrounding display.

12. The information presentation system according to claim 10, wherein the IE is a light intensity distribution of a light emitting source for each display of the plurality of displays.

13. The information presentation system according to claim 10, wherein the at least one PiP window fully covers the main screen.

14. The information presentation system according to claim 10, wherein the main screen is divided into a plurality of predefined sizes, and the at least one PiP window is displayed on at least one of the plurality of predefined sizes.

15. The information presentation system according to claim 10, wherein the IE of each of the plurality of displays is based on the width and height of the immersive impact region and a non-immersive impact region of each display.

16. The information presentation system according to claim 10, wherein the IIF for the point (Px, Py) inside the immersive impact regions of the plurality of the displays comprising:

$$= \begin{cases} Bi + \dfrac{\max(y - Py, Py - y - h)}{H}(Ti - Bi) & \text{if } x \leq Px \leq x + w \\ Bi + \dfrac{\max(x - Px, Px - x - w)}{W}(Ti - Bi) & \text{if } y \leq Py \leq y + h \\ Bi + \dfrac{\max(y - Py, Py - y - h) + \max(x - Px, Px - w - w)}{H + W}(Ti - Bi) & \text{otherwise} \end{cases},$$

wherein Bi is a lower bound threshold of the immersive impact for the i-th display of the plurality of displays, Ti is an upper bound threshold of the immersive impact for the i-th display of the plurality of displays, both Bi and Ti are in the range of [0.0, 1.0], (x,y) is a starting point of the plurality of displays, (Px, Py) is a point inside the immersive impact region, (w, h) is a width and height of the plurality of displays, and W and H are a width and a height of the immersive impact region of the plurality of displays.

* * * * *